United States Patent [19]
Giamati et al.

[11] Patent Number: 5,709,532
[45] Date of Patent: Jan. 20, 1998

[54] PROPELLER ICE PROTECTION SYSTEM AND METHOD PROVIDING REDUCED SLIDING CONTACT MAINTENANCE

[75] Inventors: Michael J. Giamati, Akron; Jeffrey J. Siesel, Cuyahoga Falls, both of Ohio

[73] Assignee: The B.F. Goodrich Company, Akron, Ohio

[21] Appl. No.: 366,202

[22] Filed: Dec. 29, 1994

[51] Int. Cl.$^6$ .................................................. F04D 29/18
[52] U.S. Cl. ................................................ 416/39; 219/483
[58] Field of Search ............... 416/39, 95; 244/134 D, 244/134 R; 219/483, 486

[56] References Cited

U.S. PATENT DOCUMENTS

| | | | |
|---|---|---|---|
| 3,455,396 | 7/1969 | Cummings | 416/95 |
| 3,657,514 | 4/1972 | Adams | 219/201 |
| 4,136,295 | 1/1979 | Sweet | 310/239 |
| 4,292,502 | 9/1981 | Adams | 219/493 |
| 4,386,749 | 6/1983 | Sweet et al. | 244/134 D |
| 5,045,670 | 9/1991 | Gilliland | 219/137 PS |

Primary Examiner—John T. Kwon
Attorney, Agent, or Firm—Kevin L. Leffel

[57] ABSTRACT

The invention relates to a propeller ice protection system having more evenly distributed sliding contact wear resulting in reduced maintenance, and a method of operating the system. According to the invention, polarity of a DC potential applied to the sliding contacts is periodically reversed in order to more evenly distribute brush wear. Specific hardware embodiments and various polarity reversing schemes are disclosed.

20 Claims, 8 Drawing Sheets

PROPELLER ICE PROTECTION SYSTEM AND METHOD PROVIDING REDUCED SLIDING CONTACT MAINTENANCE

The invention relates to a propeller ice protection system having more evenly distributed sliding contact wear resulting in reduced maintenance, and a method of operating the system. According to the invention, polarity of a DC potential applied to the sliding contacts is periodically reversed in order to more evenly distribute brush wear.

Electrothermal de-icing systems adapted for use on propellers have long been known in the art. A de-icer having one or more resistance heaters is mounted to the leading edge of each propeller blade on an aircraft propeller. This type of de-icer usually comprises a metallic heating element encased in a rubber or reinforced plastic construction. An example of an electrothermal propeller de-icer is presented in U.S. Pat. No. 4,386,749 issued to Sweet et al. Electrical power is applied to the propeller de-icers through a plurality of sliding contacts. Each sliding contact comprises a slip ring that is mounted on a propeller and an electrical brush that is mounted to the airframe by means of a brush assembly. An example of a brush assembly is presented in U.S. Pat. No. 4,136,295 issued to Sweet. An alternating current (AC) or direct current (DC) potential is applied across the sliding contacts in a predetermined timed sequence by a controller.

Though widely used and accepted in the aircraft industry, electrothermal propeller de-icing systems requiring less maintenance are generally desired. The sliding contacts frequently require maintenance due to wear that can be aggravated by vibration, dirt and oil, poor alignment, and poor contact between the brush and the slip ring. Even in ideal conditions, the electrical brushes in prior DC powered systems tend to wear at different rates. This behavior significantly reduces the useful life of a brush assembly and increases maintenance, since the fastest wearing brush determines the life of the brush assembly.

A scheme whereby maintenance is reduced by reducing the number of sliding contacts required to cycle two sets of heaters is disclosed in U.S. Pat. No. 3,657,514 issued to Adams. This approach utilizes diodes and reversing polarity of an applied DC potential to alternate application of the DC potential between sets of heaters mounted on a propeller. The number of sliding contacts necessary to control two sets of heaters mounted on a single propeller is reduced from three to two which purportedly simplifies the system and reduces maintenance. The '514 patent, however, fails to disclose or suggest any utility in reversing polarity in a propeller ice protection system that doesn't utilize diodes for control of the DC current and potential. Thus, reversing polarity is known only as a control scheme to be used in conjunction with diodes.

An ice protection system having sliding contacts with improved wear characteristics and a method for operating such a system are generally desired. In particular, a DC powered ice protection system having sliding contacts with brushes that wear at about the same rate is desired.

SUMMARY OF THE INVENTION

According to an aspect of the invention, an ice protection system is provided for an aircraft propeller that rotates relative to an airframe, comprising:

- a DC power source mounted to the airframe that generates a DC potential;
- a first sliding contact comprising a first slip ring mounted to the propeller and at least one first electrical brush mounted to the airframe that rides on the first slip ring;
- a second sliding contact comprising a second slip ring mounted to the propeller and at least one second electrical brush mounted to the airframe that rides on the second slip ring;
- a controller electrically connected to the DC power source and the first and second sliding contacts, the controller being configured to periodically apply the DC potential with a polarity across the first and second sliding contacts and to periodically reverse the polarity across the first and second sliding contacts; and,
- a plurality of first resistance heaters attached to the propeller and electrically connected to the first and second sliding contacts by conductors that apply the DC potential across every resistance heater electrically connected to the first and second sliding contacts.

According to another aspect of the invention, a method for supplying DC electrical power to a plurality of resistance heaters mounted on an aircraft propeller that rotates relative to an airframe, comprising the steps of:

- periodically applying a DC potential with a first polarity across first and second sliding contacts, the first sliding contact comprising a first slip ring mounted to the propeller and at least one first electrical brush mounted to the airframe that rides on the first slip ring, the second sliding contact comprising a second slip ring mounted to the propeller and at least one second electrical brush mounted to the airframe that rides on the second slip ring, a plurality of the heaters being electrically connected to the first and second slip rings;
- periodically applying the DC potential across every resistance heater electrically connected to the first and second slip rings; and,
- periodically reversing the first polarity.

The electrical brushes in an ice protection system according to the invention wear at about the same rate, thereby substantially increasing the useful life of the sliding contacts and reducing maintenance. Brush wear is more evenly spread over all of the brushes by periodically reversing polarity.

DETAILED DESCRIPTION

According to the invention, an ice protection system having more evenly distributed sliding contact wear and a method of operation are provided. In prior DC powered ice protection systems, one of the sliding contacts is constantly maintained at a greater electrical potential than another of the sliding contacts, and the brushes of one sliding contact tend to wear at a significantly greater rate than the brushes of another sliding contact. The sliding contact having the lesser electrical potential will be referred to herein as the "negative" sliding contact, and the sliding contact having the greater electrical potential will be referred to herein as the "positive" sliding contact. In some prior systems, the brushes of a negative sliding contact wear significantly faster than the brushes of a positive sliding contact. In other systems, the reverse occurs in that the brushes of a positive sliding contact wear significantly faster than the brushes of a negative sliding contact. The source of this behavior is not entirely clear, but it appears to be dependent on the specific brush compound and the direction of current flow. Regardless of the source, this behavior significantly reduces the useful life of a brush assembly, since the fastest wearing brush determines the life of the brush assembly. According to an aspect of the invention, generally uniform brush wear is achieved by periodically reversing polarity of the DC potential applied across the sliding contacts, resulting in increased life of the brush assembly and reduced maintenance.

Figure 1:
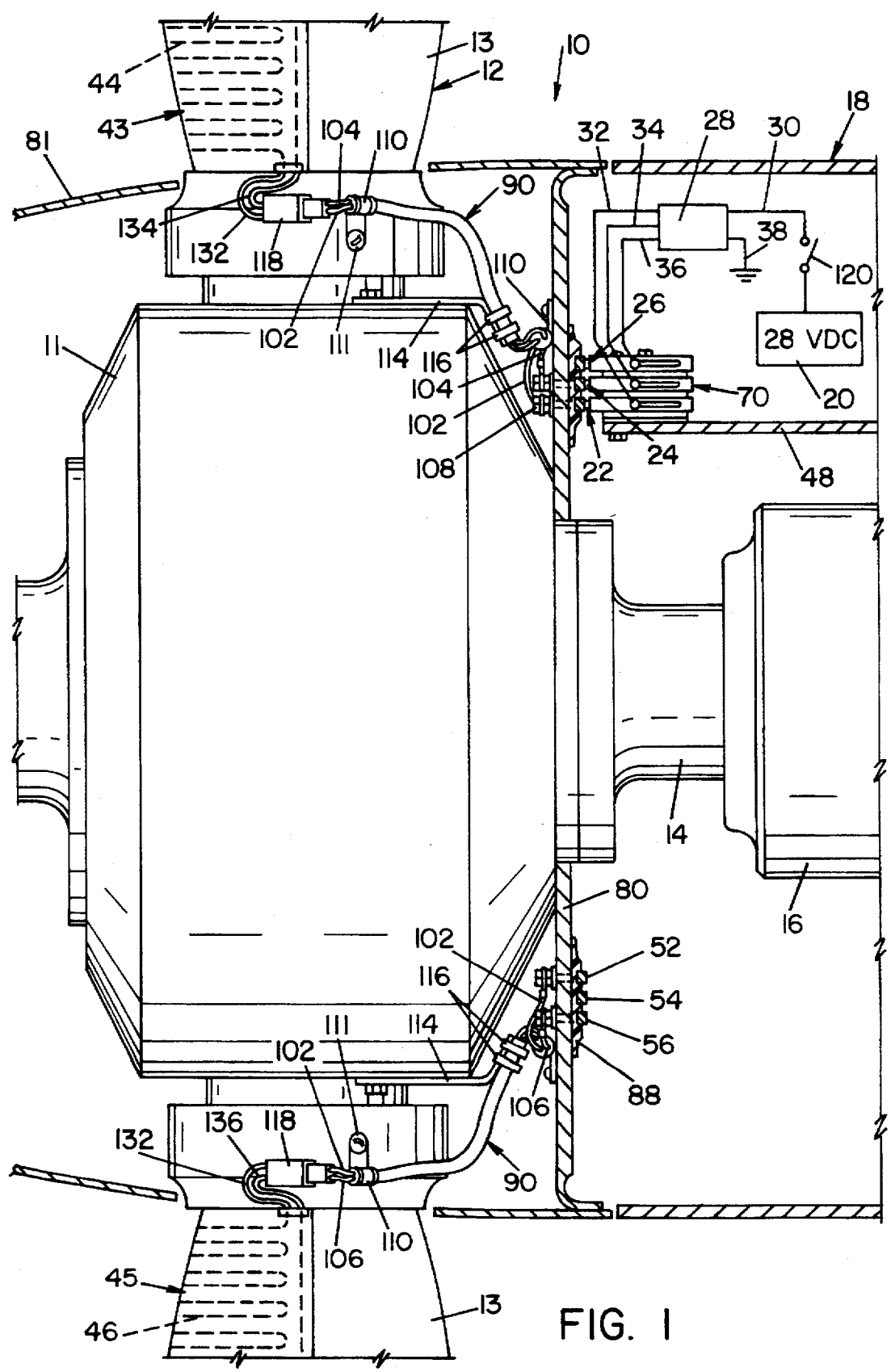
FIG. 1 presents an ice protection system according to an aspect of the invention shown mounted on a propeller and an airframe.

Various aspects of the invention are presented in FIGS. 1 through 8C, wherein like numerals are employed to designate like parts. Referring now specifically to FIG. 1, an ice protection system 10 according to an aspect of the invention is shown mounted on an aircraft propeller 12 and an aircraft airframe 18. The propeller 12 rotates relative to airframe 18. Propeller 12 comprises a plurality of propeller blades 13 mounted to a propeller hub 11. The propeller hub 11 is mounted to a drive shaft 14 extending from an aircraft engine 16 that is mounted to the airframe 18. Such arrangements are very well known in the art and the specific arrangement of FIG. 1 is presented only as an example without limiting the invention.

The ice protection system 10 according to an aspect of the invention comprises a DC (direct current) power source 20 that generates a DC potential, a controller 28, a first sliding contact 22, a second sliding contact 24, a third sliding contact 26, a plurality of first electrothermal de-icers 43 (only one shown), and a plurality of second electrothermal de-icers 45 (only one shown). The power source 20 is mounted to the airframe 18. The controller 28 is electrically connected to the DC power source 20 by power line 30. A master switch 120 may be electrically connected between the DC power source 20 and the controller 28 that permits application of the DC potential to the controller 28 when the master switch 120 is closed, and prevents application of the DC potential to the controller 28 when the master switch 120 is opened (the switch is shown in the opened position). The controller 28 is also electrically connected to the first sliding contact 22, the second sliding contact 24, and the third sliding contact 26 by distribution lines 32, 34, and 36. The DC power source 20 supplies a DC potential to the controller 28 relative to ground line 38. The controller 28 controls application of a DC potential with a polarity across the first sliding contact 22 and second sliding contact 24, and periodically reverses the polarity in a manner that will be discussed in relation to FIGS. 4 and 5A–5C.

The de-icers 43 and 45 are mounted to the leading edges of propeller blades 13, as is well known in the art. Each de-icer has at least one resistance heater. Thus, ice protection system 10 comprises a plurality of first resistance heaters 44 (only one shown), and a plurality of second resistance heaters 46 (only one shown). In the example presented, first resistance heaters 44 are mounted within first de-icers 43, and the second resistance heaters 46 are mounted within second de-icers 45, and are attached to the propeller blades 13. The electrical potential is transferred from the sliding contacts 22, 24 and 26 to the resistance heaters 44 and 46 through wire harnesses 90.

Figure 2:
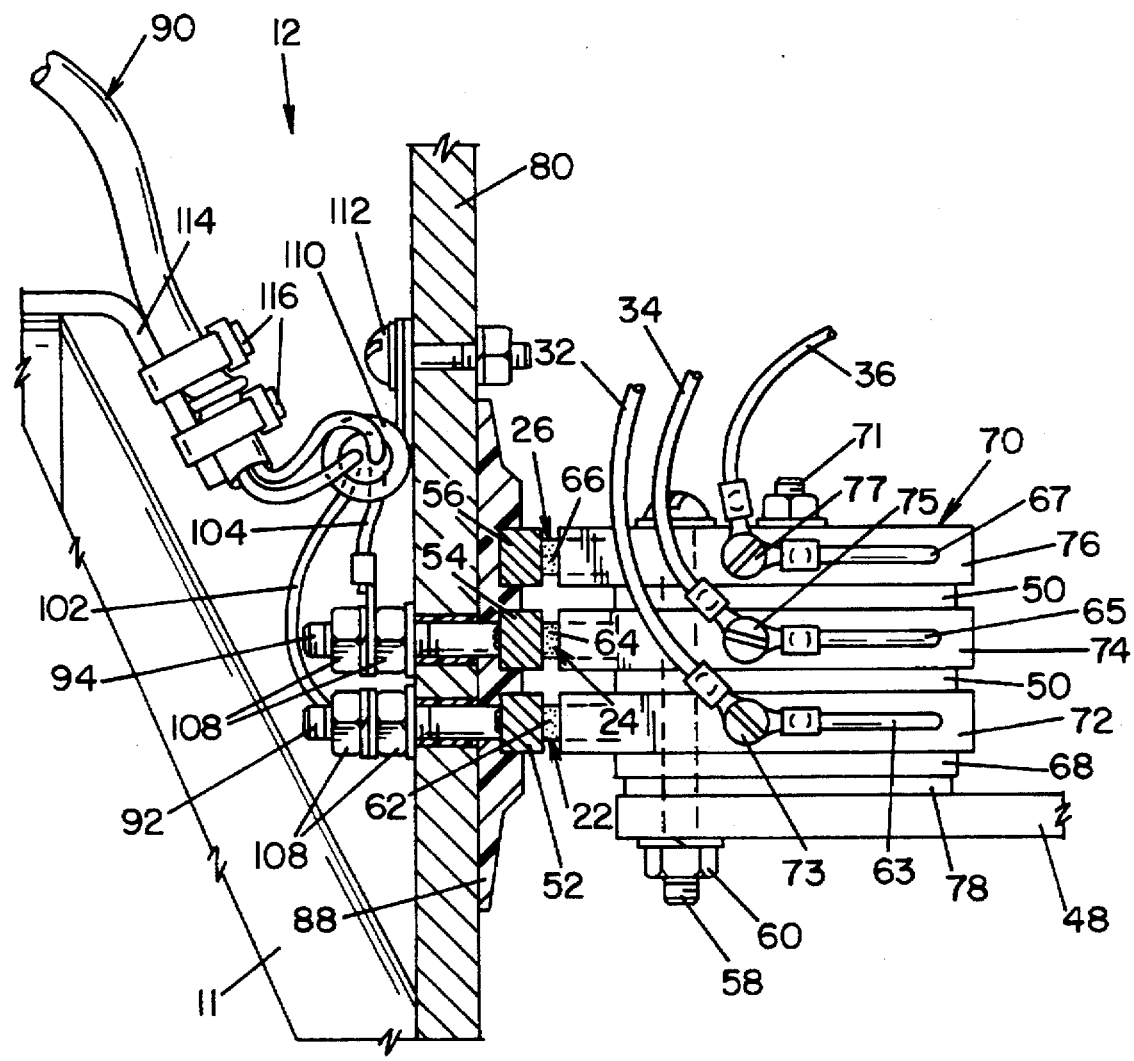
FIG. 2 presents a detailed view of the FIG. 1 ice protection system.

Referring to FIG. 2, a detailed view of sliding contacts 22, 24 and 26 is presented. The first sliding contact 22 comprises a first slip ring 52 mounted to the propeller 12 and at least one first electrical brush 62 mounted to the airframe 18 that rides on the first slip ring 52. The second sliding contact 24 comprises a second slip ring 54 mounted to the propeller 12 and at least one second electrical brush 64 mounted to the airframe 18 that rides on the second slip ring 54. The third sliding contact 26 comprises a third slip ring 56 mounted to the propeller 12 and at least one third electrical brush 66 mounted to the airframe 18 that rides on the third slip ring 56. The electrical brushes 62, 64, and 66 are mounted to the airframe by means of a brush assembly 70 that holds the brushes. The brush assembly 70 is mounted to a bracket 48 by a screw 58 and nut 60, and the bracket 48 is attached to the airframe. A spacer 68 and shims 78 are provided that maintain proper radial alignment of the brush assembly 70 with the slip rings 52, 54, and 56. According to a well known design, the brush assembly 70 comprises first brush module 72, second brush module 74, and third brush module 76 that are stacked with spacers 50 and held together with a screw and nut 71. Spacers 50 maintain proper radial alignment of each brush with its respective slip ring. The electrical brushes are slidably received within the brush modules and biased against the slip rings by springs mounted within the brush modules. A first brush lead 63 is electrically connected to the first brush 62, a second brush lead 65 is electrically connected to the second brush 64, and a third brush lead 67 is electrically connected to the third brush 66. The brush leads 63, 65, and 67 exit the individual brush modules where they are connected to the power distribution lines 32, 34, and 36 by terminal screws 73, 75, and 77. It is not intended to limit the invention to the specific embodiment depicted since various brush assemblies and mounting arrangements are well known in the art and equally suited in the practice of the invention. The slip rings may be formed from a copper alloy, as is well known in the art, and suitable brush compounds are available from National Electrical Carbon Corporation, Greenville, S.C., U.S.A.

Slip rings 52, 54, and 56 are mounted to the propeller 12 by means of a slip ring holder 88 that receives and holds the rings electrically insulated from each other. The slip rings 52, 54, and 56 and holder 88 are annular in shape. The slip ring holder 88 is mounted to a bulkhead 80 which, in turn, is mounted to the propeller hub 11. A spinner dome 81 (FIG. 1) is mounted to the bulkhead and serves as a streamlined cover for the propeller 12, as is well known in the art. A first conductive stud 92 extends from first slip ring 52, and a second conductive stud 94 extends from the second slip ring 54. The first and second conductive studs 92 and 94 extend through bulkhead 80.

The wire harness 90 comprises a first harness wire 102 and a second harness wire 104 that are attached to the bulkhead 80 by clamp 110, and a screw and nut 112. The ends of wires 102 and 104 terminate in ring terminals that are electrically connected to studs 92 and 94, respectively, by clamping the ring terminals between nuts 108. Wire ties 116 attach the end of wire harness 90 to a harness bracket 114 as shown in FIG. 1 and 2. As depicted in FIG. 1, wire harnesses 90 transfer electrical power to the de-icers mounted on propeller blades 13 where each wire harness 90 is mounted to the base of each propeller blade 13 by a clamp 110 and screw 111. A first de-icer lead 132 is electrically connected to the first harness wire 102, and a second de-icer lead 134 is electrically connected to the second harness wire 104. The first and second de-icer leads 132 and 134 apply the electrical potential from the first and second harness wires 102 and 104 across the first resistance heater 44. In the embodiment presented, the connections are conveniently established by a connector 118. Referring again to FIG. 2, a pair of first and second studs 92 and 94, and a wire harness 90 is provided for each first heater 44 spaced equidistantly around the circumference of bulkhead 80.

Figure 3:
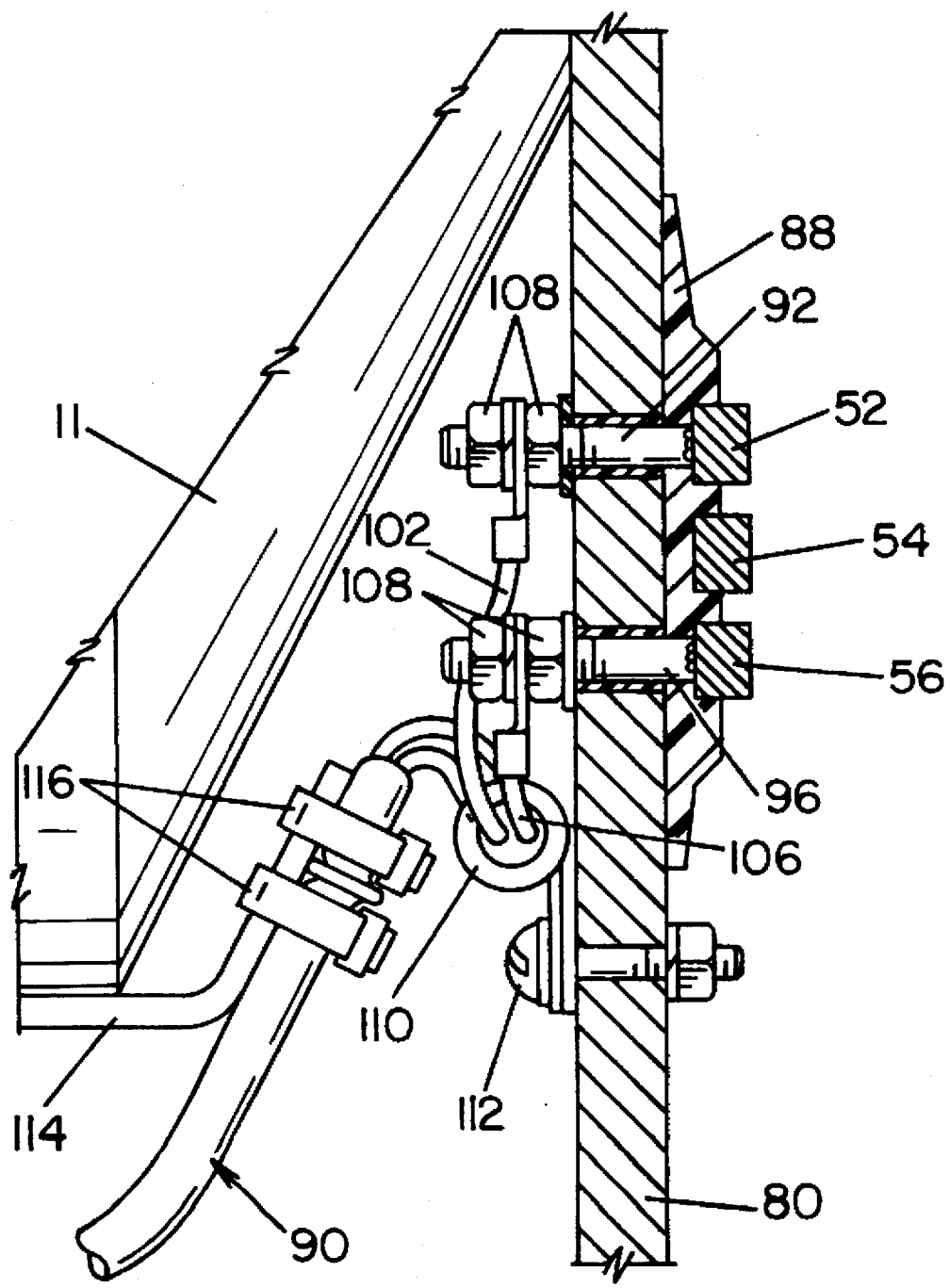
FIG. 3 presents a detailed view of the FIG. 1 ice protection system.

The electrical potential across first slip ring 52 and third slip ring 56 is transferred to second resistance heater 46 as depicted in FIG. 3. First and third conductive studs 92 and 96 extend from first and third slip rings 52 and 56, respectively, and through bulkhead 80. Here, wire harness 90 comprises the first harness wire 102 and a third harness wire 106 that are attached to the bulkhead 80 by clamp 110, and a screw and nut 112. Wire ties 116 attach the end of wire harness 90 to harness bracket 114. The ends of wires 102 and 106 terminate in ring terminals that are electrically connected to studs 92 and 96, respectively, by clamping the ring terminals between nuts 108. Referring to FIG. 1, a first de-icer lead 132 is electrically connected to the first harness wire 102, and a third de-icer lead 136 is electrically connected to a third harness wire 106. The first and third de-icer leads 132 and 136 apply the electrical potential from the first and third harness wires 102 and 106 across the second resistance heater 46. In the embodiment presented, the connections are conveniently established by a connector 118. Referring again to FIG. 3, a pair of first and third studs 92 and 96, and a wire harness 90 is provided for each second heater 46 spaced equidistantly around the circumference of bulkhead 80.

Every heater connected across the first and third sliding contacts 22 and 26 receives the potential applied to those contacts by the controller 28. Likewise, every heater connected across the first and second sliding contacts 22 and 24 receives the potential applied to those contacts by the controller 28. This feature is distinctly different from the system described in U.S. Pat. No. 3,657,514 wherein the first and second heaters are electrically connected across two sliding contacts, and diodes control application of the DC potential to the first and second heaters. In the '514 patent, every heater connected across the two sliding contacts does not receive the potential applied to those contacts.

Figure 4:
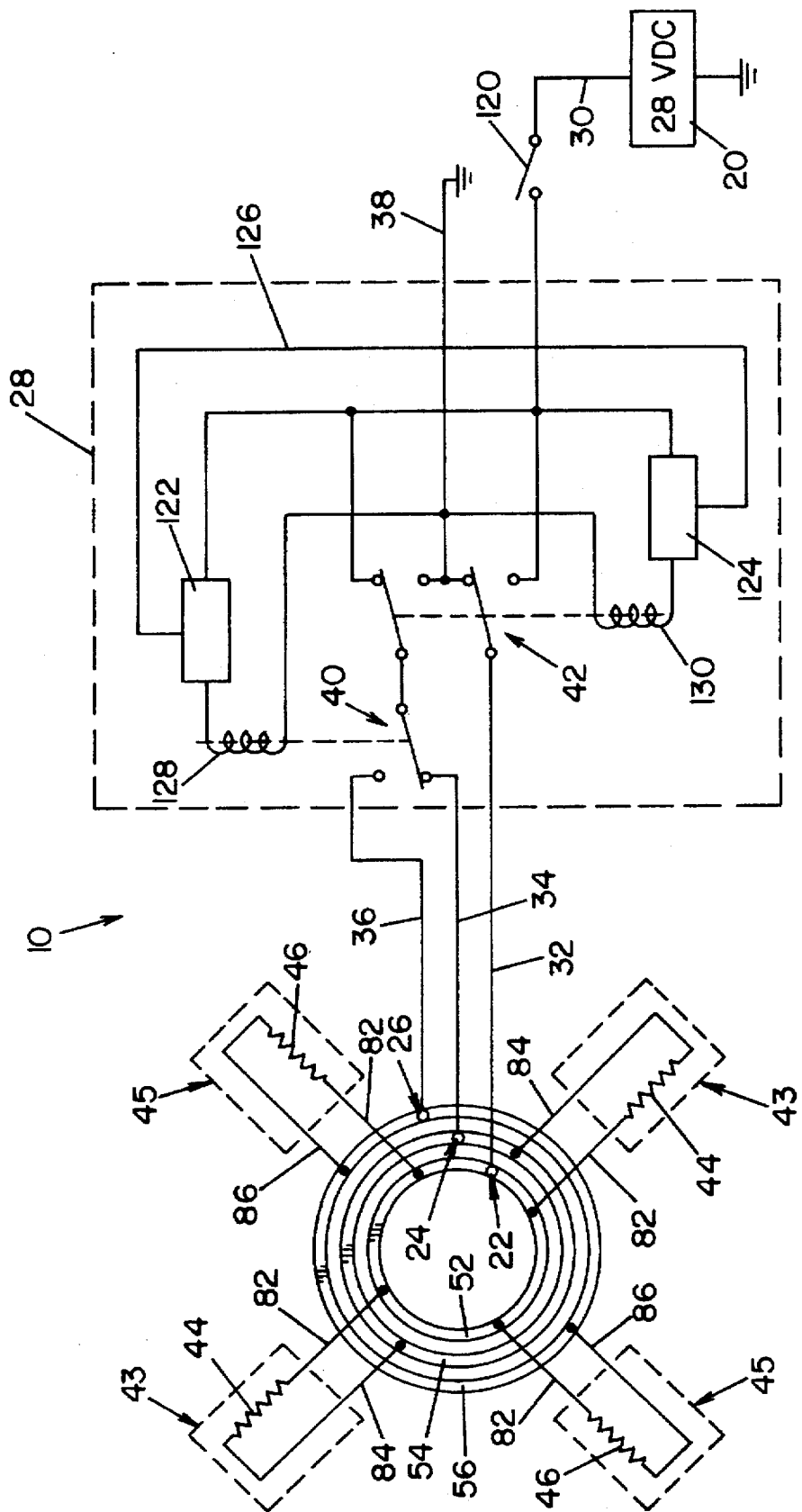
FIG. 4 presents an electrical schematic diagram of the FIG. 1 ice protection system.

Referring to FIG. 4, the ice protection system 10 described thus far is depicted in an electrical schematic diagram. The ice protection system depicted in FIG. 4 is adapted for use on a propeller having four propeller blades. More or fewer propeller blades are contemplated in the practice of the invention. The DC potential is provided by the DC power supply 20, which is connected to controller 28 via power supply line 30. A master switch 120 may be inserted in power supply line 30 to control application of the DC potential from power supply 20 to controller 28. The controller 28 controls application of the DC potential to the sliding contacts 22, 24 and 26 through distribution lines 32, 34 and 26, respectively. As previously described, sliding contact 22 comprises the electrical brush 62 (FIG. 2) and the slip ring 52, sliding contact 24 comprises the electrical brush 64 (FIG. 2) and the slip ring 54, and sliding contact 26 comprises the electrical brush 66 (FIG. 2) and slip ring 56. A plurality of first de-icers 43 having first electrical heaters 44 are electrically connected across the first sliding contact 22 and the second sliding contact 24 by the first conductors 82 and the second conductors 84. A plurality of second de-icers 45 having second electrical heaters 46 are electrically connected across the first sliding contact 22 and the third sliding contact 26 by first conductors 82 and third conductors 86. Thus, the first and second conductors 82 and 84 apply the DC potential across every resistance heater electrically connected to the first 22 and second sliding contacts 24 upon application of the DC potential across the first and second sliding contacts 22 and 24. Likewise, the first and third conductors 82 and 86 apply the DC potential across every resistance heater electrically connected to the first and third sliding contacts 22 and 26 upon application of the DC potential across the first and third sliding contacts 22 and 26.

In the embodiment presented in FIGS. 1–3, each first conductor 82 comprises the first conductive stud 92, the first harness wire 102, and the first de-icer lead 132 electrically connected to each first resistance heater 44 and each second resistance heater 46. Each second conductor 84 comprises the second conductive stud 94, the second harness wire 104, and the second de-icer lead 134 electrically connected to each first resistance heater 44. Each third conductor 86 comprises the third conductive stud 96, the third harness wire 106, and the third de-icer lead 136 electrically connected to each second resistance heater 46. As noted previously, various other ways of electrically connecting the first and second resistance heaters 44 and 46 to sliding contacts 22, 24 and 26 are well known in the art. In any such embodiments, the first, second, and third conductors 82, 84, and 86 would comprise whatever components that electrically connect the first and second resistance heaters 44 and 46 to sliding contacts 22, 24 and 26.

Figure 5A:
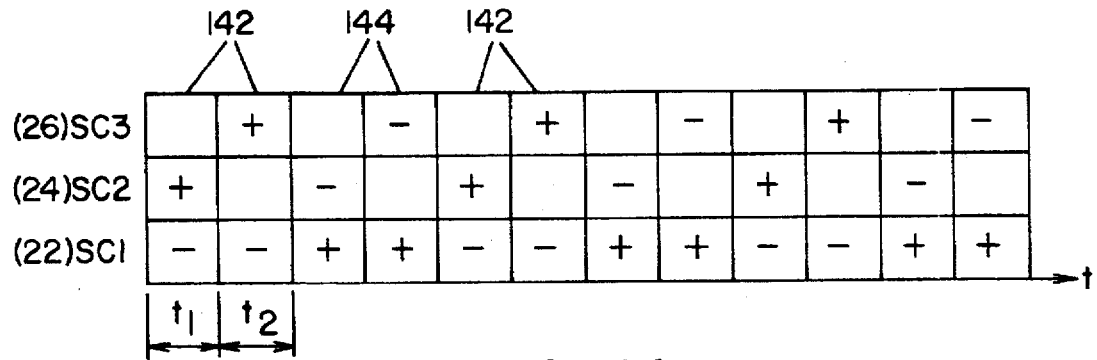
FIG. 5A presents a cycling and polarity switching sequence according to an aspect of the invention.

The controller 28 has a first switch 40 that periodically applies the DC potential with a polarity across the first sliding contact 22 and second sliding contact 24, and a second switch 42 that periodically reverses the polarity across the first sliding contact 22 and the second sliding contact 24. The first switch 40 also periodically applies the DC potential with a polarity across the first and third sliding contacts 22 and 26, and the second switch 42 periodically reverses the polarity across the first and third sliding contacts 22 and 26. In this embodiment, first switch 40 is driven by a solenoid 128, which is controlled by a first switch controller 122. The first switch 40 alternately applies the potential to second sliding contact 24 and third sliding contact 26 with the first sliding contact 22 serving as a common to the other two contacts. Heating alternates between sets of de-icers mounted on opposing blades. Such arrangements are well known in the art. Referring to FIG. 5A, an embodiment is presented wherein controller 28 applies the DC potential across first sliding contact 22 (SC1) and second sliding contact 24 (SC2) for a time indicated as $t_1$ with a polarity 142. The controller 28 also applies the DC potential across the first sliding contact 22 and the third sliding contact 26 (SC3) for a time indicated as $t_2$ with the polarity 142. The times $t_1$ and $t_2$ are preferably equal and usually range from about 10 to 90 seconds, though other durations are contemplated in the practice of the invention. The polarity 142 is reversed to polarity 144 the next time the DC potential is applied across first and second sliding contacts 22 and 24, and across first and third sliding contacts 22 and 26. Thus, the polarity across first and second sliding contacts 22 and 24 is reversed every time the first switch 40 applies the DC potential across the first and second sliding contacts 22 and 24. Likewise, the potential across first and third sliding contacts 22 and 26 is reversed every time the first switch 40 applies the DC potential across the first and third sliding contacts 22 and 26. This process may be repeated indefinitely for a time t.

Referring again to FIG. 4, the second switch 42 may be shuttled between two positions by a second solenoid 130. As depicted, sliding contacts 26 and 24 are connected to the 28 VDC potential when sliding contact 22 is connected to ground, and sliding contacts 26 and 24 are connected to ground when sliding contact 22 is connected to the 28 VDC potential. Second solenoid 130 is controlled by second switch controller 124. If synchronization is desired, as in the FIG. 5A embodiment, a synchronization line 126 may be provided in order to synchronize switch controllers 122 and 124. Though shown with solenoid driven switches (relays), any suitable electromechanical or solid state switching device that performs the same function, such as latching relays and solid state relays, may be used in the practice of the invention. It is not intended to limit the invention to the specific embodiment depicted.

Tests have shown that reversing the polarity of the DC potential to the sliding contacts significantly increases the time between required replacement of the brushes in the brush assembly. In service on the aircraft, all the brushes in the brush assembly will wear, and at least one of the brushes will eventually reach a point of maximum wear that necessitates replacement of that brush. The time over which this occurs will be referred to herein as the "service period." One or more of the other brushes is usually not worn to the point of maximum wear. However, all of the brushes are replaced since keeping track of and replacing each brush on an individual basis is generally too burdensome and impractical. Thus, the service period is determined by the brush that wears the fastest, i.e. the brush that has the greatest wear rate. As noted previously, the brushes riding on one ring have a significantly greater wear rate than the brushes riding on another ring in prior DC systems. The maximum useful life of all the brushes is not utilized.

Tests have demonstrated that all the brushes in a DC system according to the invention tend to wear at about the same rate, which is significantly less than the wear rate of the brush that wears the fastest in prior DC systems. Switching polarity spreads the wear more evenly overall the brushes. Thus, all of the brushes reach the point of maximum wear at about the same point in time, and nearly all of the useful life of each brush may be utilized. The service period is still determined by the brush that wears the fastest, but the service period is significantly longer. The service period may be increased by as much as a third or more. For example, a service period 600 hours for a prior DC system may be increased to 900 hours or more through use of the invention.

Figure 5B:
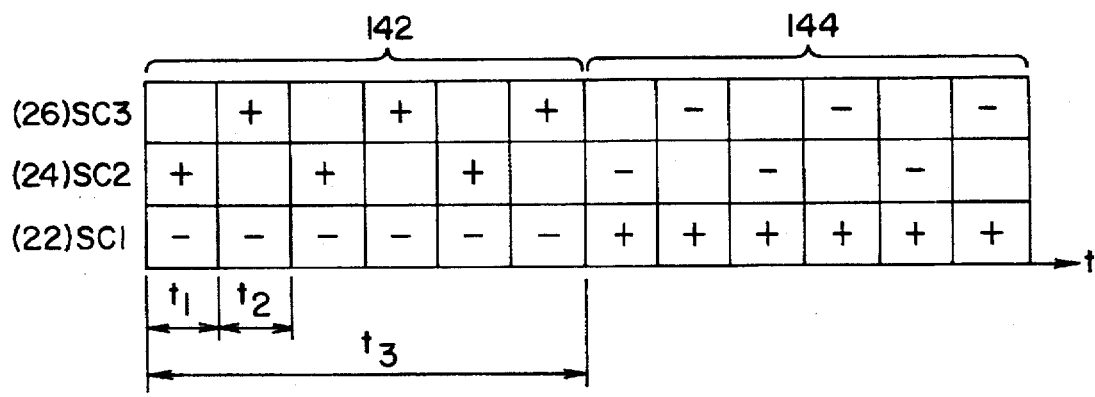
FIG. 5B presents another cycling and polarity switching sequence according to an aspect of the invention.
Figure 5C:
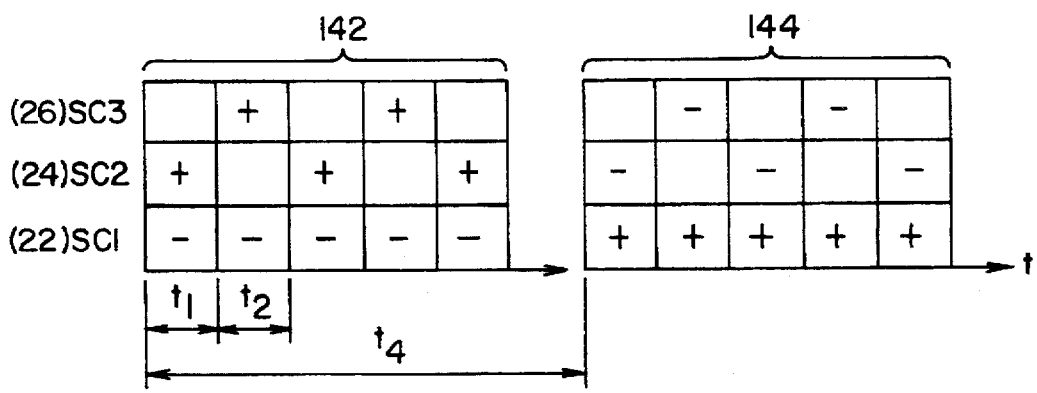
FIG. 5C presents yet another cycling and polarity switching sequence according to an aspect of the invention.

Referring now to FIG. 5B, an alternative embodiment is presented wherein the controller 28 applies the DC potential with a polarity across the first 22 and second sliding contacts 24 at least twice without reversing the polarity 142. The polarity 142 is switched to polarity 144 at $t_3$. Likewise, the controller 28 applies the DC potential across the first and third sliding contacts 22 and 26 at least twice before the second switch 42 reverses polarity 142 to polarity 144. In the specific embodiment presented, the controller 28 applies the DC potential across the first, second and third sliding contacts 22, 24 and 26 three times before reversing the polarity 142 to polarity 144. Other multiples are contemplated. The synchronization line 126 of FIG. 4 may be utilized to achieve synchronization. Referring to FIG. 5C, an alternative embodiment is presented wherein the controller 28 reverses the polarity 142 across the first and second sliding contacts 22 and 24, and across the first and third sliding contacts 22 and 26 every time the master switch 120 is closed at $t_4$ after being opened. In use on an aircraft, master switch 120 is closed each time the ice protection system is activated, and opened each time the ice protection system is deactivated. The synchronization line 126 of FIG. 4 is optional in this embodiment.

Figure 6:
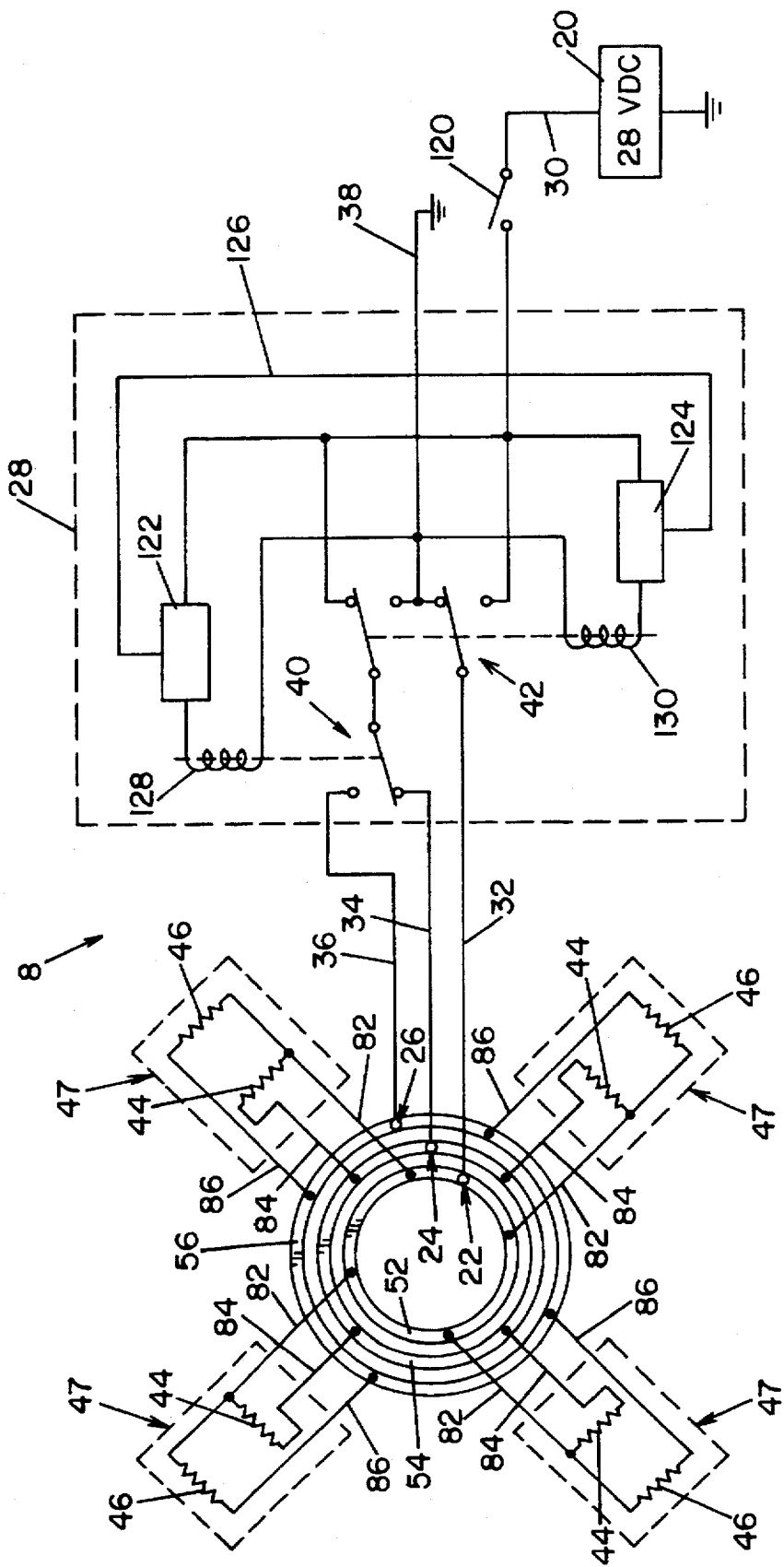
FIG. 6 presents an electrical schematic diagram of another ice protection system according to an aspect of the invention.

Referring to FIG. 6, an alternate embodiment depicting an ice protection system 8 for use with a four blade propeller is presented. The ice protection system 8 would work equally well with a propeller having more or fewer blades. In this embodiment, both the first resistance heater 44 and the second resistance heater 46 are contained within a de-icer 47. First resistance heater 44 is mounted inboard relative to the second resistance heater 46. One de-icer 47 having three leads is mounted to each propeller blade. Conductors 82, 84 and 86 are grouped together and connect each de-icer 47 to the sliding contacts 22, 24 and 26. This is accomplished in an embodiment similar to the FIG. 1 system by grouping harness wires 102, 104, and 106 in each wire harness 90, and providing groups of three studs 92, 94 and 96 for each de-icer 47. The rest of the ice protection system of FIG. 6 may be the same as that presented in FIG. 4. According to this scheme, heating of the de-icers 47 alternates between inboard and outboard stations on propeller blades 13, which is well known in the art. The cycling and polarity reversing scheme presented in FIGS. 5A–5C may be used equally well with the ice protection system 8 of FIG. 6.

Figure 7:
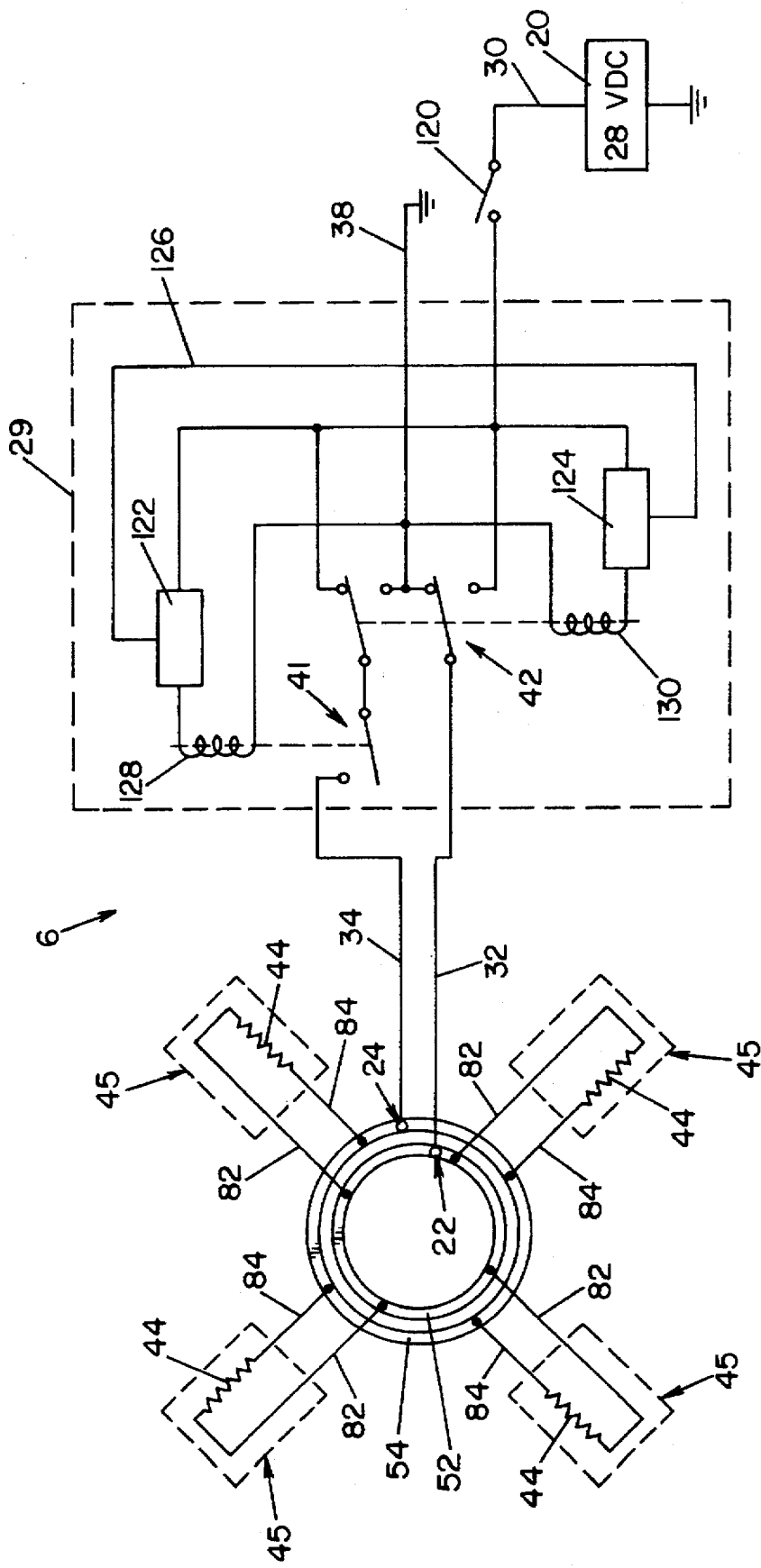
FIG. 7 presents an electrical schematic diagram of yet another ice protection system according to an aspect of the invention.

Referring to FIG. 7, an ice protection system 6 according to an aspect of the invention is presented for use with a propeller having four propeller blades that utilizes only two sliding contacts 22 and 24. Ice protection system 6 utilizes only first resistance heaters 44 that are electrically connected to sliding contacts 22 and 24 by conductors 82 and 84. This is accomplished in an ice protection system similar to that presented in FIGS. 1–3 by providing only two slip rings 52 and 54, and two brush modules 72 and 74. A pair of first and second studs 92 and 94 is provided for each de-icer 72 and 74, and each wire harness 90 has first and second harness wires 102 and 104.

A controller 29 has a first switch 41 that periodically applies the DC potential with a polarity across the first sliding contact 22 and second sliding contact 24, and a second switch 42 that periodically reverses the polarity across the first and second sliding contacts 22 and 24. In the embodiment presented, first switch 41 is driven by a solenoid 128, which is controlled by a first switch controller 122.

Figure 8A:
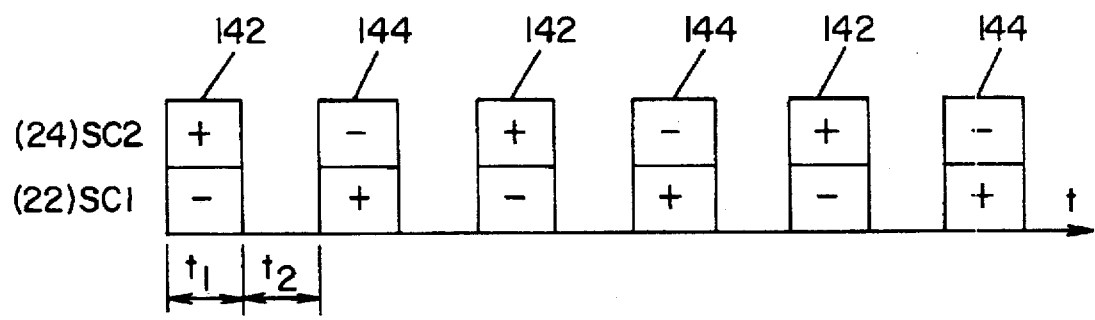
FIG. 8A presents a cycling and polarity switching sequence according to an aspect of the invention.

Every heater 44 connected across the first and second sliding contacts 22 and 24 receives the potential applied to those contacts by the controller 29. Thus, all of the resistance heaters 44 generate heat when switch 41 is closed. Referring to FIG. 8A, an embodiment is presented wherein the DC potential with a polarity 142 is applied across first sliding contact 22 (SC1) and second sliding contact 24 (SC2) for a time indicated as $t_1$. Application of the DC potential is ceased across first sliding contact 22 and second sliding contact 24 for a time indicated as $t_2$. The times $t_1$ and $t_2$ are preferably equal and usually range from about 10 to 90 seconds, though other times are contemplated in the practice of the invention. The polarity 142 across sliding contacts 22 and 24 is reversed to polarity 144 the next time the DC potential is applied across sliding contacts 22 and 24. Thus, the polarity across sliding contacts 22 and 24 is reversed every time the first switch 40 applies the DC potential across the first and second sliding contacts 22 and 24. This process may be repeated indefinitely for a time t.

Referring again to FIG. 7, the second switch 42 may be opened and closed by a second solenoid 130. As depicted, sliding contact 24 is connected to the 28 VDC potential when sliding contact 22 is connected to ground, and sliding contact 24 is connected to ground when sliding contact 22 is connected to the 28 VDC potential. Second solenoid 130 is controlled by a second switch controller 124. A synchronization line 126 may be provided in order to synchronize switch controllers 122 and 124. Though shown with solenoid driven switches (relays), any suitable electromechanical or solid state switching device that performs the same function, such as latching relays and solid state relays, may be used in the practice of the invention. It is not intended to limit the invention to the specific embodiment depicted.

Figure 8B:
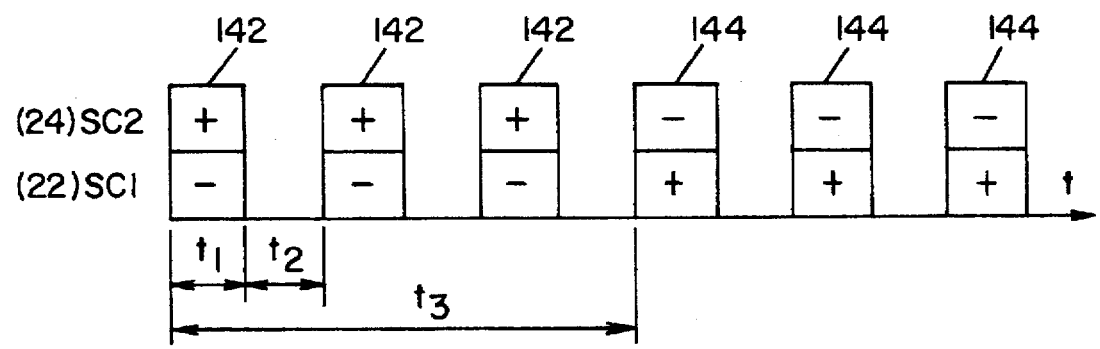
FIG. 8B presents another cycling and polarity switching sequence according to an aspect of the invention.
Figure 8C:
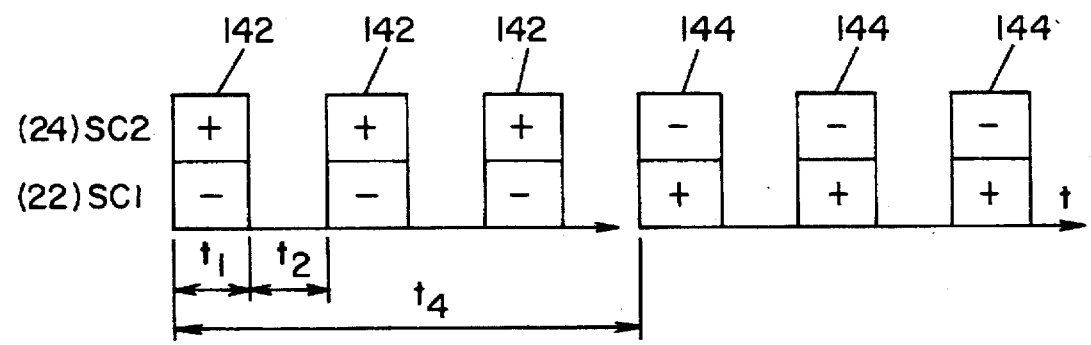
FIG. 8C presents yet another cycling and polarity switching sequence according to an aspect of the invention.

Referring now to FIG. 8B, an alternative embodiment is presented wherein controller 29 applies the DC potential across the first 22 and second sliding contacts 24 at least twice without reversing the polarity across the first and second sliding contacts 22 and 24. The controller 29 reverses the first polarity 142 at $t_3$. In the embodiment presented, the first switch 41 applies the DC potential across the first and second sliding contacts 22 and 24 three times before reversing the polarity 142 to polarity 144. Other multiples are contemplated. Referring to FIG. 8C, an alternative embodiment is presented wherein the controller 29 reverses the first polarity 142 every time the master switch 120 is closed at $t_4$ after being opened. In use on an aircraft, master switch 120 is closed each time the ice protection system is activated, and opened each time the ice protection system is deactivated. The synchronization line 126 of FIG. 7 is optional for this embodiment.

Many variations are evident from the disclosure provided. The invention may be applied to propellers having two or more propeller blades, and to aircraft having more than one propeller. In the case of multiple propellers, cycling of the heaters may be alternated from one propeller blade to the next. In addition, more than first and second resistance heaters may be used, which would require more than three sliding contacts per propeller. Each sliding contact could comprise more than one electrical brush riding on a single slip ring which may be advantageous for use with high current systems. Any means of controlling application of the DC potential to the sliding contacts and switching polarity is contemplated in the practice of the invention. It is not intended to limit the invention to the specific embodiments presented since all the possible variations in the electrical circuit design are too numerous to mention individually, and are well within the abilities of one skilled in the art of electrical circuit design. The terms "first," "second," and "third," with regard to the various components are used only to facilitate the disclosure, and are not intended to signify any particular order.

Though described in relation to a DC power source, the invention may also be useful with an AC (alternating current) power source. In certain AC ice protection systems, an AC potential is applied to one sliding contact, and system ground is applied to another sliding contact. The electrical heaters are electrically connected across the two sliding contacts. One of the sliding contacts may wear at a greater rate than the other sliding contact. For example, the sliding contact connected to system ground may wear faster (or slower) than the sliding contact connected to the AC potential. The wear may be more evenly distributed by alternating the AC potential and system ground connections across a pair of sliding contacts during system operation according to schemes similar to those previously described herein. Thus, each sliding contact receives an AC potential part of the time, and system ground the rest of the time.

It is evident that many variations are possible without departing from the true scope and spirit of the invention as defined by the following claims.

We claim:

1. An ice protection system for an aircraft propeller that rotates relative to an airframe, comprising:

a DC power source mounted to the airframe that generates a DC potential;

a first sliding contact comprising a first slip ring mounted to the propeller and at least one first electrical brush mounted to the airframe that rides on said first slip ring;

a second sliding contact comprising a second slip ring mounted to the propeller and at least one second electrical brush mounted to the airframe that rides on said second slip ring;

a controller electrically connected to said DC power source and said first and second sliding contacts, said controller being configured to periodically apply said DC potential with a polarity across said first and second sliding contacts and to periodically reverse said polarity across said first and second sliding contacts; and, a plurality of first resistance heaters attached to the propeller and electrically connected to said first and second sliding contacts by conductors that apply said DC potential across every resistance heater electrically connected to said first and second sliding contacts.

2. The ice protection system of claim 1, further comprising a third sliding contact comprising a third slip ring mounted to the propeller and at least one third electrical brush mounted to the airframe that rides on said third slip ring, and wherein said controller is electrically connected to said third sliding contact, said controller being configured to periodically apply said DC potential with a polarity across said first and third sliding contacts and to periodically reverse said polarity across said first and third sliding contacts, and further comprising a plurality of second resistance heaters attached to the propeller and electrically connected to said first and third sliding contacts by conductors that apply said DC potential across every resistance heater electrically connected to said first and third sliding contacts upon application of said DC potential across said first and third sliding contacts.

3. An ice protection system for an aircraft propeller that rotates relative to an airframe, comprising:

a DC power source mounted to the airframe that generates a DC potential;

a first sliding contact comprising a first slip ring mounted to the propeller and at least one first electrical brush mounted to the airframe that rides on said first slip ring;

a second sliding contact comprising a second slip ring mounted to the propeller and at least one second electrical brush mounted to the airframe that rides on said second slip ring;

a first switch configured to periodically apply said DC potential with a polarity across said first and second sliding contacts;

a second switch configured to periodically reverse said polarity across said first and second sliding contacts; and, a plurality of first resistance heaters attached to the propeller and electrically connected to said first and second sliding contacts by conductors that apply said DC potential across every resistance heater electrically connected to said first and second sliding contacts.

4. The ice protection system of claim 3, further comprising a third sliding contact comprising a third slip ring mounted to the propeller and at least one third electrical brush mounted to the airframe that rides on said third slip ring, and wherein said first switch is configured to periodically apply said DC potential with a polarity across said first and third sliding contacts and said second switch is configured to periodically reverse said polarity across said first and third sliding contacts, and further comprising a plurality of second resistance heaters attached to the propeller and electrically connected to said first and third sliding contacts by conductors that apply said DC potential across every resistance heater electrically connected to said first and third sliding contacts upon application of said DC potential across said first and third sliding contacts.

5. A method for supplying DC electrical power to a plurality of resistance heaters mounted on an aircraft propeller that rotates relative to an airframe, comprising the steps of:

periodically applying a DC potential with a first polarity across first and second sliding contacts, said first sliding contact comprising a first slip ring mounted to the propeller and at least one first electrical brush mounted to the airframe that rides on said first slip ring, said second sliding contact comprising a second slip ring mounted to the propeller and at least one second electrical brush mounted to the airframe that rides on said second slip ring, a plurality of the heaters being electrically connected to said first and second slip rings;

periodically applying said DC potential across every resistance heater electrically connected to said first and second slip rings; and, periodically reversing said first polarity.

6. The method of claim 5, further comprising the steps of:

periodically applying said DC potential with a polarity across said first sliding contact and a third sliding contact, said third sliding contact comprising a third slip ring mounted to the propeller and at least one third electrical brush mounted to the airframe that rides on said third slip ring, a plurality of the heaters being electrically connected to said first and third slip rings;

applying said DC potential across every resistance heater electrically connected to said first and third slip rings; and, periodically reversing said polarity across said first and third sliding contacts.

7. An ice protection system for an aircraft propeller that rotates relative to an airframe, comprising:

a DC power source mounted to the airframe that generates a DC potential;

a first sliding contact comprising a first slip ring mounted to the propeller and at least one first electrical brush mounted to the airframe that rides on said first slip ring;

a second sliding contact comprising a second slip ring mounted to the propeller and at least one second electrical brush mounted to the airframe that rides on said second slip ring;

a controller electrically connected to said DC power source and said first and second sliding contacts, said controller being configured to periodically apply said DC potential with a polarity across said first and second sliding contacts and to periodically reverse said polarity across said first and second sliding contacts every time said controller applies said DC potential across said first and second sliding contacts; and, a plurality of first resistance heaters attached to the propeller and electrically connected to said first and second sliding contacts by conductors that apply said DC potential across every resistance heater electrically connected to said first and second sliding contacts.

8. An ice protection system for an aircraft propeller that rotates relative to an airframe, comprising:

a DC power source mounted to the airframe that generates a DC potential;

a first sliding contact comprising a first slip ring mounted to the propeller and at least one first electrical brush mounted to the airframe that rides on said first slip ring;

a second sliding contact comprising a second slip ring mounted to the propeller and at least one second electrical brush mounted to the airframe that rides on said second slip ring;

a controller electrically connected to said DC power source and said first and second sliding contacts, said controller being configured to periodically apply said DC potential with a polarity across said first and second sliding contacts and to periodically reverse said polarity across said first and second sliding contacts, and to apply said DC potential across said first and second sliding contacts at least twice without reversing said polarity across said first and second sliding contacts; and, a plurality of first resistance heaters attached to the propeller and electrically connected to said first and second sliding contacts by conductors that apply said DC potential across every resistance heater electrically connected to said first and second sliding contacts.

9. An ice protection system for an aircraft propeller that rotates relative to an airframe, comprising:

a DC power source mounted to the airframe that generates a DC potential;

a first sliding contact comprising a first slip ring mounted to the propeller and at least one first electrical brush mounted to the airframe that rides on said first slip ring;

a second sliding contact comprising a second slip ring mounted to the propeller and at least one second electrical brush mounted to the airframe that rides on said second slip ring;

a controller electrically connected to said DC power source and said first and second sliding contacts, said controller being configured to periodically apply said DC potential with a polarity across said first and second sliding contacts and to periodically reverse said polarity across said first and second sliding contacts;

a plurality of first resistance heaters attached to the propeller and electrically connected to said first and second sliding contacts by conductors that apply said DC potential across every resistance heater electrically connected to said first and second sliding contacts; and, a master switch electrically connected between said DC power source and said controller that permits application of said DC potential to said controller when said master switch is closed, and prevents application of said DC potential to said controller when said master switch is opened, wherein said controller is configured to reverse said polarity across said first and second sliding contacts every time said master switch is closed after being opened.

10. An ice protection system for an aircraft propeller that rotates relative to an airframe, comprising:

a DC power source mounted to the airframe that generates a DC potential;

a first sliding contact comprising a first slip ring mounted to the propeller and at least one first electrical brush mounted to the airframe that rides on said first slip ring;

a second sliding contact comprising a second slip ring mounted to the propeller and at least one second electrical brush mounted to the airframe that rides on said second slip ring;

a third sliding contact comprising a third slip ring mounted to the propeller and at least one third electrical brush mounted to the airframe that rides on said third slip ring;

a controller electrically connected to said DC power source and said first, second, and third sliding contacts, said controller being configured to periodically apply said DC potential with a polarity across said first and second sliding contacts and to periodically reverse said polarity across said first and second sliding contacts, and to periodically apply said DC potential with a polarity across said first and third sliding contacts and to reverse said polarity across said first and third sliding contacts every time said controller applies said DC potential to said first and third sliding contacts;

a plurality of first resistance heaters attached to the propeller and electrically connected to said first and second sliding contacts by conductors that apply said DC potential across every resistance heater electrically connected to said first and second sliding contacts; and, a plurality of second resistance heaters attached to the propeller and electrically connected to said first and third sliding contacts by conductors that apply said DC potential across every resistance heater electrically connected to said first and third sliding contacts upon application of said DC potential across said first and third sliding contacts.

11. An ice protection system for an aircraft propeller that rotates relative to an airframe, comprising:

a DC power source mounted to the airframe that generates a DC potential;

a first sliding contact comprising a first slip ring mounted to the propeller and at least one first electrical brush mounted to the airframe that rides on said first slip ring;

a second sliding contact comprising a second slip ring mounted to the propeller and at least one second electrical brush mounted to the airframe that rides on said second slip ring;

a third sliding contact comprising a third slip ring mounted to the propeller and at least one third electrical brush mounted to the airframe that rides on said third slip ring;

a controller electrically connected to said DC power source and said first, second, and third sliding contacts, said controller being configured to periodically apply said DC potential with a polarity across said first and second sliding contacts and to periodically reverse said polarity across said first and second sliding contacts, and to periodically apply said DC potential with a polarity across said first and third sliding contacts and to periodically reverse said polarity across said first and third sliding contacts, and to apply said DC potential across said first and third sliding contacts at least twice without reversing said polarity across said first and third sliding contacts;

a plurality of first resistance heaters attached to the propeller and electrically connected to said first and second sliding contacts by conductors that apply said DC potential across every resistance heater electrically connected to said first and second sliding contacts; and, a plurality of second resistance heaters attached to the propeller and electrically connected to said first and third sliding contacts by conductors that apply said DC potential across every resistance heater electrically connected to said first and third sliding contacts upon application of said DC potential across said first and third sliding contacts.

12. An ice protection system for an aircraft propeller that rotates relative to an airframe, comprising:

a DC power source mounted to the airframe that generates a DC potential;

a first sliding contact comprising a first slip ring mounted to the propeller and at least one first electrical brush mounted to the airframe that rides on said first slip ring;

a second sliding contact comprising a second slip ring mounted to the propeller and at least one second electrical brush mounted to the airframe that rides on said second slip ring;

a third sliding contact comprising a third slip ring mounted to the propeller and at least one third electrical brush mounted to the airframe that rides on said third slip ring;

a controller electrically connected to said DC power source and said first, second, and third sliding contacts, said controller being configured to periodically apply said DC potential with a polarity across said first and second sliding contacts and to periodically reverse said polarity across said first and second sliding contacts, and to periodically apply said DC potential with a polarity across said first and third sliding contacts and to periodically reverse said polarity across said first and third sliding contacts;

a plurality of first resistance heaters attached to the propeller and electrically connected to said first and second sliding contacts by conductors that apply said DC potential across every resistance heater electrically connected to said first and second sliding contacts;

a plurality of second resistance heaters attached to the propeller and electrically connected to said first and third sliding contacts by conductors that apply said DC potential across every resistance heater electrically connected to said first and third sliding contacts upon application of said DC potential across said first and third sliding contacts; and, a master switch electrically connected between said DC power source and said controller that permits application of said DC potential to said controller when said master switch is closed, and prevents application of said DC potential to said controller when said master switch is opened, wherein said controller is configured to reverse said polarity across said first and third sliding contacts every time said master switch is closed after being opened.

13. The ice protection system of claim 12, wherein said controller comprises a first switch configured to periodically apply said DC potential with a polarity across said first and second sliding contacts, and a second switch configured to periodically reverse said polarity across said first and second sliding contacts.

14. An ice protection system for an aircraft propeller that rotates relative to an airframe, comprising:

a DC power source mounted to the airframe that generates a DC potential;

a first sliding contact comprising a first slip ring mounted to the propeller and at least one first electrical brush mounted to the airframe that rides on said first slip ring;

a second sliding contact comprising a second slip ring mounted to the propeller and at least one second electrical brush mounted to the airframe that rides on said second slip ring;

a third sliding contact comprising a third slip ring mounted to the propeller and at least one third electrical brush mounted to the airframe that rides on said third slip ring;

a controller electrically connected to said DC power source and said first, second, and third sliding contacts, said controller comprising a first switch configured to periodically apply said DC potential with a polarity across said first and second sliding contacts and to subsequently apply said DC potential with a polarity across said first and third sliding contacts, and a second switch configured to periodically reverse said polarity across said first and second sliding contacts and said polarity across said first and third sliding contacts;

a plurality of first resistance heaters attached to the propeller and electrically connected to said first and second sliding contacts by conductors that apply said DC potential across every resistance heater electrically connected to said first and second sliding contacts; and, a plurality of second resistance heaters attached to the propeller and electrically connected to said first and third sliding contacts by conductors that apply said DC potential across every resistance heater electrically connected to said first and third sliding contacts upon application of said DC potential across said first and third sliding contacts.

15. A method for supplying DC electrical power to a plurality of resistance heaters mounted on an aircraft propeller that rotates relative to an airframe, comprising the steps of:

periodically applying a DC potential with a first polarity across first and second sliding contacts, said first sliding contact comprising a first slip ring mounted to the propeller and at least one first electrical brush mounted to the airframe that rides on said first slip ring, said second sliding contact comprising a second slip ring mounted to the propeller and at least one second electrical brush mounted to the airframe that rides on said second slip ring, a plurality of the heaters being electrically connected to said first and second slip rings;

periodically applying said DC potential across every resistance heater electrically connected to said first and second slip rings; and, reversing said first polarity every time said DC potential is applied across said first and second sliding contacts.

16. A method for supplying DC electrical power to a plurality of resistance heaters mounted on an aircraft propeller that rotates relative to an airframe, comprising the steps of:

periodically applying a DC potential with a first polarity across first and second sliding contacts, said first sliding contact comprising a first slip ring mounted to the propeller and at least one first electrical brush mounted to the airframe that rides on said first slip ring, said second sliding contact comprising a second slip ring mounted to the propeller and at least one second electrical brush mounted to the airframe that rides on said second slip ring, a plurality of the heaters being electrically connected to said first and second slip rings;

periodically applying said DC potential across every resistance heater electrically connected to said first and second slip rings;

periodically reversing said first polarity; and, applying said DC potential across said first and second sliding contacts at least twice without reversing said polarity across said first and second sliding contacts.

17. A method for supplying DC electrical power to a plurality of resistance heaters mounted on an aircraft propeller that rotates relative to an airframe, comprising the steps of:

periodically applying a DC potential with a first polarity across first and second sliding contacts, said first sliding contact comprising a first slip ring mounted to the propeller and at least one first electrical brush mounted to the airframe that rides on said first slip ring, said second sliding contact comprising a second slip ring mounted to the propeller and at least one second electrical brush mounted to the airframe that rides on said second slip ring, a plurality of the heaters being electrically connected to said first and second slip rings, said DC potential being provided by a DC power source through a master switch;

periodically applying said DC potential across every resistance heater electrically connected to said first and second slip rings; and, reversing said first polarity every time said master switch is closed after being opened.

18. A method for supplying DC electrical power to a plurality of resistance heaters mounted on an aircraft propeller that rotates relative to an airframe, comprising the steps of:

periodically applying a DC potential with a polarity across first and second sliding contacts, said first sliding contact comprising a first slip ring mounted to the propeller and at least one first electrical brush mounted to the airframe that rides on said first slip ring, said second sliding contact comprising a second slip ring mounted to the propeller and at least one second electrical brush mounted to the airframe that rides on said second slip ring, a plurality of the heaters being electrically connected to said first and second slip rings;

applying said DC potential across every resistance heater electrically connected to said first and second slip rings;

periodically reversing said polarity across said first and second sliding contacts;

periodically applying said DC potential with a polarity across said first sliding contact and a third sliding contact, said third sliding contact comprising a third slip ring mounted to the propeller and at least one third electrical brush mounted to the airframe that rides on said third slip ring, a plurality of the heaters being electrically connected to said first and third slip rings;

applying said DC potential across every resistance heater electrically connected to said first and third slip rings; and, reversing said polarity across said first and third sliding contacts every time said DC potential is applied across said first and third sliding contacts.

19. A method for supplying DC electrical power to a plurality of resistance heaters mounted on an aircraft propeller that rotates relative to an airframe, comprising the steps of:

periodically applying a DC potential with a polarity across first and second sliding contacts, said first sliding contact comprising a first slip ring mounted to the propeller and at least one first electrical brush mounted to the airframe that rides on said first slip ring, said second sliding contact comprising a second slip ring mounted to the propeller and at least one second electrical brush mounted to the airframe that rides on said second slip ring, a plurality of the heaters being electrically connected to said first and second slip rings;

periodically applying said DC potential across every resistance heater electrically connected to said first and second slip rings;

periodically reversing said polarity across said first and second sliding contacts;

periodically applying said DC potential with a polarity across said first sliding contact and a third sliding contact, said third sliding contact comprising a third slip ring mounted to the propeller and at least one third electrical brush mounted to the airframe that rides on said third slip ring, a plurality of the heaters being electrically connected to said first and third slip rings;

applying said DC potential across every resistance heater electrically connected to said first and third slip rings;

periodically reversing said polarity across said first and third sliding contacts; and, applying said DC potential across said first and third sliding contacts at least twice without reversing said polarity across said first and third sliding contacts.

20. A method for supplying DC electrical power to a plurality of resistance heaters mounted on an aircraft propeller that rotates relative to an airframe, comprising the steps of:

periodically applying a DC potential with a polarity across first and second sliding contacts, said first sliding contact comprising a first slip ring mounted to the propeller and at least one first electrical brush mounted to the airframe that rides on said first slip ring, said second sliding contact comprising a second slip ring mounted to the propeller and at least one second electrical brush mounted to the airframe that rides on said second slip ring, a plurality of the heaters being electrically connected to said first and second slip rings, said DC potential being provided by a DC power source through a master switch;

periodically applying said DC potential across every resistance heater electrically connected to said first and second slip rings;

periodically reversing said first polarity;

periodically applying said DC potential with a polarity across said first sliding contact and a third sliding contact, said third sliding contact comprising a third slip ring mounted to the propeller and at least one third electrical brush mounted to the airframe that rides on said third slip ring, a plurality of the heaters being electrically connected to said first and third slip rings;

applying said DC potential across every resistance heater electrically connected to said first and third slip rings; and, reversing said second polarity across said first and third sliding contacts every time said master switch is closed after being opened.

* * * * *